Figure 1:
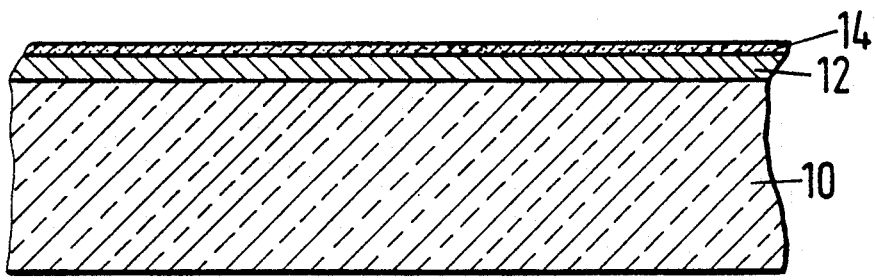

United States Patent [19]

Hölscher

[11] Patent Number: 4,992,087
[45] Date of Patent: Feb. 12, 1991

[54] PROCESS FOR THE PRODUCTION OF A TEMPERED OR BENT GLASS PLATE WITH A REAR COATING, GLASS PLATE PRODUCED ACCORDING TO THE SAME AND THE USE THEREOF

[75] Inventor: Heinz W. Hölscher, Datteln, Fed. Rep. of Germany

[73] Assignee: Flachglas Aktiengesellschaft, Bayern, Fed. Rep. of Germany

[21] Appl. No.: 470,497

[22] Filed: Jan. 26, 1990

[30] Foreign Application Priority Data

Jan. 28, 1989 [DE] Fed. Rep. of Germany ....... 3902596

[51] Int. Cl.$^5$ ............................................. C03C 17/36
[52] U.S. Cl. ..................................... 65/60.2; 65/60.4; 65/106; 428/622
[58] Field of Search ....................... 65/60.2, 60.4, 106, 65/107, 114; 428/622

[56] References Cited

U.S. PATENT DOCUMENTS 4,715,879 12/1987 Schmitte et al. ..................... 65/60.2
4,749,397 6/1988 Chesworth et al. ................. 65/60.2
4,826,525 5/1989 Chesworth et al. ................. 65/60.2

FOREIGN PATENT DOCUMENTS 2112815 7/1983 United Kingdom .

Primary Examiner—Robert L. Lindsay
Attorney, Agent, or Firm—Sughrue, Mion, Zinn, Macpeak & Seas

[57] ABSTRACT

Process for the production of a tempered or bent glass plate provided with a transmission-reducing coating, in which to one side of the glass plate is applied at least one metal coating with a preponderant content of at least one metal or a metal alloy from elements of numbers 22 to 28 of the Periodic System of elements and to the latter is applied a metal-containing protective coating and subsequently a thermal tempering or bending process is performed in air at a temperature between approximately 580° C. and 680° C. and in which the thickness and material of the protective coating are selected in such a way that during the tempering or bending process there is no significant oxygen diffusion to the metal coating, characterized in that in the case of a rear arrangement of the reflecting metal coating made opaque through an adequate thickness, the protective coating is formed by an alloy of Al with Ti and/or Zr, the glass plate produced according the same and the use thereof.

14 Claims, 1 Drawing Sheet

PROCESS FOR THE PRODUCTION OF A TEMPERED OR BENT GLASS PLATE WITH A REAR COATING, GLASS PLATE PRODUCED ACCORDING TO THE SAME AND THE USE THEREOF

The invention relates to a process for the production of a tempered or bent glass plate provided with a transmission-reducing coating, in which to one side of the glass plate is applied at least one metal coating with a preponderant content of at least one metal or a metal alloy from elements of numbers 22 to 28 of the Periodic System of elements and to the latter is applied a metal-containing protective coating and subsequently a thermal tempering or bending process is performed in air at a temperature between approximately 580° C. and 680° C. and in which the thickness and material of the protective coating are selected in such a way that during the tempering or bending process there is no significant oxygen diffusion to the metal coating, a glass plate produced according to the same and the use thereof.

DE-OS 35 44 840 discloses a process of the aforementioned type, in which the metal coating is applied in a thickness such that, due to the reduced transmission, the glass plate is suitable as a solar or sun protection plate, in which the protective coating comprises metal or mixed metal oxide.

The known process has proved satisfactory, but it is not readily suitable for the production of glass plates with a rear, opaque, reflecting ($R_L$ typically approximately 50%) coating, such as are e.g. used as rear-view mirrors or as front wall plates, particularly lining or covering plates optically adapted to solar protection windows (U.S. Pat. No. 2,596,515).

In addition, the setting of the substoichiometric composition of the protective coating necessary in the known process is complicated. Another problem is that prior to the performance of the tempering or bending process, the coating is relatively sensitive.

EP-OS 233 003 already discloses making highly transparent silver coating systems bendable or temperable in that to the silver coating applied to the glass carrier is applied a thin protective coating of aluminium, titanium, zinc, tantalum or zirconium and this is followed by a metal oxide interference coating. The use of aluminium as the external protective coating for the metal coating according to the prior art leads to problems which are difficult to combat, because the aluminium coating is relatively soft and therefore sensitive to scratching and abrasion. Therefore the protective coating can easily be damaged in the production process during handling or cutting the coated strip size, so that a channel for oxygen diffusion to the metal coating forms and consequently the metal coating is destroyed during the bending or tempering process.

The problem of the present invention is to so further develop the process of the aforementioned type that it permits the production of glass plates, such as are e.g. used as rear-view mirrors or front wall plates with a rear, opaque and reflecting coating, the latter being relatively resistant to scratching and abrasion prior to the bending or tempering process and accompanied by an additional simplification of the coating process.

In a further development of the preamble-basing process, this problem is inventively solved in that in the case of a rear arrangement of the reflecting metal coating made opaque by an adequate thickness, the protective coating is formed by an alloy of aluminium and Ti and/or Zr. The protective coating can have a Ti and/or Zr content of at least 10 atomic %.

The invention also proposes that the protective coating has a Ti and/or Zr content of at least 20 atomic %.

It is possible to proceed in such a way that the protective coating preferably comprising an AlTi alloy without a Zr content, has a Ti content of 30 to 50 atomic % and in particularly preferred manner approximately 40 atomic %.

According to another embodiment of the invention the protective coating preferably comprising an AlZr alloy without Ti content has a Zr content of 25 to 45 atomic % and in particularly preferred manner approximately 35 atomic %.

Another embodiment of the inventive process is characterized in that the protective coating is applied with a thickness of 10 to 50 nm. The protective coating can be applied in a thickness of 20 to 30 nm.

The invention also proposes that, prior to the application of the metal coating, an adhesive coating constituted by at least one of the metal oxides from the group $TiO_2$, $Ta_2O_5$, $ZrO_2$ and $SiO_2$ is applied to the glass carrier.

A preferred embodiment of the invention is characterized in that the coating is at least partly applied by magnetron cathodic sputtering.

The protective coating can be applied by simultaneous or alternating sputtering of two cathodes with an Al target and a Ti and/or Zr target. It is alternatively possible to proceed in such a way that the protective coating is applied by sputtering a meltable or powder metallurgically produced alloying target.

The invention also relates to the glass plate produced according to the inventive process and the use thereof as a rear-view mirror, front wall plate or decorative panel.

The invention is based on the surprising finding that it is possible to produce glass plates e.g. suitable as rear-view mirrors or front wall plates and in particular covering plates optically adapted to solar protection windows and having an excellent resistance to scratching and abrasion both directly according to the coating process and also after the bending or tempering process, whilst giving an excellent protection to the metal coating against oxygen influence during bending or tempering in that, in the claimed manner, to the metal coating is applied a binary or ternary aluminium alloying coating with a relatively high titanium or zirconium content. This was even less expected because tests with pure titanium or zirconium top coatings did not lead to the desired protection for the metal coating serving as the reflective coating, because although oxidizing in air during the bending or tempering process, unlike the aluminium alloying coating provided according to the invention and which during the bending or tempering process forms a dense oxide coating on the surface, they do not provide adequate oxygen protection action for the metal coating.

Whereas, as claimed, according to the invention the coating of the glass carrier can take place in different ways, e.g. by thermal evaporation or electron beam vacuum evaporation and also by the CVD process, it is particularly advantageous to use a magnetron sputtering process. If coating takes place by the alternate sputtering of two cathodes with an aluminium target and a titanium or zirconium target, sandwich structures form constituted by very thin individual coatings with a thickness of 0.1 to 1 nm. It is particularly advantageous to use magnetron cathodic sputtering of alloying targets in non-reactive atmosphere, e.g. argon, such as can also take place in the known process.

It is a particular advantage that the inventively used coating system in its simplest form, namely with the coating sequence glass plate/metal coating/aluminium alloy, is a purely metallic system only requiring coating systems or installations without complicated locks between the individual coating chambers, which leads to greatly reduced production costs.

The invention is described in greater detail hereinafter relative to non-limitative embodiments and the attached drawings, wherein show:

FIG. 1: a first embodiment of a glass plate which can be produced according to the inventive process in a section at right angles to the plate plane.

Figure 2:
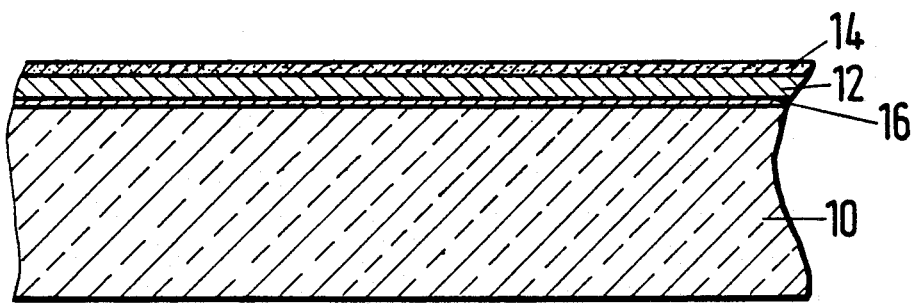

FIG. 2: another embodiment of a glass plate manufacturable according to the inventive process, also in a section at right angles to the plate plane.

In the case of the embodiment of FIG. 1 a 60 nm thick chromium coating 12 is applied to a glass carrier 10 and is followed by a 20 nm thick protective coating 14 constituted by an Al-Ti alloy. In the embodiment of FIG. 2, in which a metal coating 12 and a protective coating 14 are applied to the glass carrier 10 in the manner in accordance with the embodiment of FIG. 1, between glass carrier 10 and metal coating 12 is provided a 70 nm thick $Ta_2O_5$ adhesive coating 16.

Glass plates of the type shown in FIGS. 1 and 2 can be produced according to the following examples.

EXAMPLE 1

Using DC magnetron cathodic sputtering firstly a 60 nm chromium coating is applied to a float glass carrier 10, said coating having an optical transmission of below 1%. Using powder metallurgically produced targets with 60 atomic % aluminium and 40 atomic % zirconium an approximately 25 nm thick Al-Ti protective coating 14 is sputtered onto the chromium coating 12. The container of the installation is pumped out to $5.10^{-3}$ Pa for the coating process and is subsequently flooded to $5.10^{-1}$ Pa with pure argon. The glass carrier dimensions are $10 \times 10$ cm.

The coated glass plates 10 were then tempered in a laboratory furnace for simulating the bending and tempering process for 5 minutes and at 670° C. Additional tests revealed that the coating composition Cr-AlTi can be tempered up to 9 minutes without destroying the chromium metal coating 12. The moisture resistance of the overall coating was tested at 40° C. and 100% relative atmospheric humidity and no coating damage occurred. When observed from the uncoated glass carrier side, following tempering the glass plate had such a high reflection that it could be used as a rear-view mirror or front wall member.

The scratching and abrasion resistance of the coating system was tested in the following way. The glass plate to be tested was placed on a rotary table. A rough felt was fixed to a rigid arm and rested on the coating (bearing surface $1 \times 1$ cm). This arm was loaded with a clearly defined weight and acted with a corresponding force on the test plate coating. The felt described circular paths on the test plates and the number of revolutions was counted. The thus treated plates were subsequently tempered in a laboratory furnace for 5 minutes. Those areas of the metal coating 12 where the protective coating 14 was no longer sufficiently thick were subject to oxidation. In these areas the coating became transparent and had a good contrast with respect to the optically dense functional coating. In the transmitted light of an intense light source, following tempering, the grooves were counted.

The following Table 1 gives the results of this test based on practical conditions. The reference values are those obtained when covering the chromium metal coating 12 by a pure aluminium coating. This coating is already significantly attacked after a single revolution. In the case of the inventive covering by means of an Al-Ti protective coating 14, even after 200 revolutions the coating has far fewer grooves.

TABLE 1

| Results of scratching/abrasion test, the information in columns 2 and 3 being in grooves/cm. | | |
|---|---|---|
| Number of revolutions | Cr - Al (Comparison Plate) | Cr - AlTi (Example 1) |
| 1 | 48 | 0 |
| 50 | Destroyed | 2 |
| 100 | Destroyed | 7 |
| 150 | Destroyed | 11 |
| 200 | Destroyed | 14 |

EXAMPLE 2

The Al-Ti protective coating 14 of Example 1 was replaced by an Al-Zr protective coating 14. The latter was sputtered with a melt-metallurgically produced target containing 65 atomic % aluminium and 35 atomic % zirconium. The glass plates were tempered at 670° C. for up to 12 minutes without undergoing visible damage. Table 2 gives the results of the scratching/abrasion test when using the Al-Zr alloy. There is a significant improvement compared with the chromium metal coating 12 covered with a pure aluminium coating.

TABLE 2

| Results of scratching/abrasion test, the information in columns 2 and 3 being in grooves/cm. | | |
|---|---|---|
| Number of revolutions | Cr - Al (Comparison Plate) | Cr - AlZr (Example 2) |
| 1 | 48 | 0 |
| 50 | Destroyed | 2 |
| 100 | Destroyed | 1 |
| 150 | Destroyed | 2 |
| 200 | Destroyed | 2 |

EXAMPLE 3

A high-grade steel coating 12 (DIN 1.4401) was sputtered in a thickness of 80 nm onto a glass carrier 10 and covered with a 25 nm thick Al-Zr coating (65/35 atomic %). The coating system was resistant to high temperatures and moisture and had a mechanical strength comparable with Examples 1 and 2.

EXAMPLE 4

The same procedure as in Example 3 was used, but a $Ta_2O_5$ adhesive coating 16 constituting an interference coating was applied between the glass carrier 10 and the high-grade steel coating 12. Sputtering took place from a metallic tantalum target and such an oxygen quantity was introduced into the containers that $Ta_2O_5$ was deposited on the substrate. $Ta_2O_5$ coatings with thicknesses up to 80 nm were produced. The complete coating system was resistant to high temperatures and moisture and had a mechanical strength comparable to Examples 1 and 2.

The inventive features disclosed in the above description, the drawings and claims can be essential to the realization of the different embodiments of the invention both singly and in random combinations.

I claim:

1. A process for the production of a tempered or bent glass plate provided with a reflective coating, comprising the steps of:

applying to the rear side of the glass plate at least one opaque metal layer with a preponderant content of at least one metal or a metal alloy from elements of numbers 22 to 28 of the Periodic System of elements;

applying to said at least one metal layer a protective layer;

thermal tempering or bending said coated glass plate in air at a temperature between approximately 580° C. and 680° C., wherein the thickness and material content of said protective layer are selected such that during the tempering or bending step there is no significant oxygen diffusion to said at least one metal layer, and wherein said protective layer is formed by an alloy of Al with Ti and/or Zr with the content thereof at least 10 atomic %.

2. Process according to claim 1, wherein the protective layer has a Ti and/or Zr content of at least 20 atomic %.

3. Process according to claim 1, wherein the protective layer comprises an AlTi alloy without a Zr content, and has a Ti content of 30 to 50 atomic %.

4. Process according to claim 3, wherein the protective layer has a Ti content of approximately 40 atomic %.

5. Process according to claim 1, wherein the protective layer comprises an AlZr alloy without a Ti content, and has a Zr content of 25 to 45 atomic %.

6. Process according to claim 5, wherein the protective layer has a Zr content of approximately 35 atomic %.

7. Process according to claim 1, wherein the protective layer is applied in a thickness of 10 to 50 nm.

8. Process according to claim 7, wherein the protective layer is applied in a thickness of 20 to 30 nm.

9. Process according to claim 1, further comprising the step of, prior to the application of the metal layer, applying to the glass carrier an adhesive layer of at least one of the metal oxides from the group consisting of $TiO_2$, $Ta_2O_5$, $ZrO_2$ and $SiO_2$.

10. Process according to claim 9, wherein the adhesive layer is applied in sufficient thickness that said adhesive layer acts as colour-modifying interference layer.

11. Process according to claim 1, wherein said step of applying at least one of the layers comprises a magnetron cathodic sputtering of said at leas one layer.

12. Process according to claim 11, wherein the protective layer is applied by simultaneous or alternating sputtering of two cathodes with an Al target and a Ti and/or Zr target.

13. Process according to claim 11, wherein the protective layer is applied by sputtering a melt or powder-metallurgically produced alloying target with a corresponding composition.

14. Glass plate with a rear, opaque and reflecting coating produced according to the process of claim 1.

* * * * *